(12) United States Patent
Jones

(10) Patent No.: US 8,842,009 B2
(45) Date of Patent: Sep. 23, 2014

(54) MULTIPLE LIGHT SENSOR MULTIPLE LIGHT FIXTURE CONTROL

(71) Applicant: MoJo Labs, Inc., Longmont, CO (US)

(72) Inventor: Morgan Jones, Longmont, CO (US)

(73) Assignee: MoJo Labs, Inc., Longmont, CO (US)

( * ) Notice: Subject to any disclaimer, the term of this patent is extended or adjusted under 35 U.S.C. 154(b) by 0 days.

(21) Appl. No.: 13/913,157

(22) Filed: Jun. 7, 2013

(65) Prior Publication Data

US 2013/0328486 A1  Dec. 12, 2013

Related U.S. Application Data

(60) Provisional application No. 61/656,905, filed on Jun. 7, 2012.

(51) Int. Cl.
*G08B 13/00* (2006.01)

(52) U.S. Cl.
USPC ........... 340/541; 340/540; 340/469; 340/468; 340/995.28

(58) Field of Classification Search
USPC ................. 340/907, 931, 932, 989, 990–994, 340/995.28, 995.27, 468, 469, 540, 541; 315/149–159, 247, 185 S, 291, 307, 315/312–326
See application file for complete search history.

(56) References Cited

U.S. PATENT DOCUMENTS

| | | | |
|---|---|---|---|
| 5,812,422 A | 9/1998 | Lyons | |
| 6,340,864 B1 | 1/2002 | Wacyk | |
| 6,741,351 B2 | 5/2004 | Marshall et al. | |
| 7,570,246 B2 | 8/2009 | Maniam et al. | |
| 7,583,901 B2 | 9/2009 | Nakagawa et al. | |
| 7,926,300 B2 | 4/2011 | Roberts | |
| 7,952,292 B2 | 5/2011 | Vegter et al. | |
| 8,305,014 B1 | 11/2012 | Li et al. | |
| 8,330,395 B2 | 12/2012 | Hoschopf | |
| 8,410,706 B2 | 4/2013 | Steiner et al. | |
| 2006/0087841 A1 | 4/2006 | Chern et al. | |
| 2007/0058987 A1 | 3/2007 | Suzuki | |
| 2008/0203273 A1 | 8/2008 | Deurenberg | |
| 2008/0309255 A1 | 12/2008 | Myers et al. | |
| 2008/0310850 A1 | 12/2008 | Pederson et al. | |
| 2009/0200958 A1 | 8/2009 | Doherty et al. | |
| 2009/0245806 A1 | 10/2009 | Murayama et al. | |
| 2010/0007600 A1 | 1/2010 | Deurenberg et al. | |
| 2010/0045191 A1 | 2/2010 | Aendekerk | |
| 2010/0284690 A1 | 11/2010 | Rajagopal et al. | |
| 2010/0327757 A1 | 12/2010 | Chung et al. | |

(Continued)

OTHER PUBLICATIONS

U.S. Appl. No. 13/310,911, Jun. 21, 2013, Non-Final OA.

(Continued)

*Primary Examiner* — Tuyet Thi Vo
(74) *Attorney, Agent, or Firm* — Maschoff Brennan

(57) ABSTRACT

Systems and methods are disclosed to control light output at one or more light fixtures based on input from one or more light detectors. Embodiments of the invention may also be used for auto commissioning, personal control and/or day lighting. Some embodiments of the invention can be used to ensure that light output at the light fixtures provides a combined uniform photometric distribution within an architectural space. Moreover, embodiments of the invention can respond to changes to ambient light, which illuminates the architectural space from a window, door, or television, etc., in a smooth and non-oscillating way. Embodiments of the invention can be implemented in lighting systems employing multiple light fixtures having one or more light source and multiple light detectors.

12 Claims, 12 Drawing Sheets

(56) References Cited

U.S. PATENT DOCUMENTS

| | | |
|---|---|---|
| 2010/0327764 A1 | 12/2010 | Knapp |
| 2011/0018465 A1 | 1/2011 | Ashdown |
| 2011/0031897 A1 | 2/2011 | Henig et al. |
| 2011/0084615 A1 | 4/2011 | Welten |
| 2011/0115386 A1 | 5/2011 | Delnoij |
| 2011/0156596 A1 | 6/2011 | Salsbury |
| 2011/0199004 A1 | 8/2011 | Henig et al. |
| 2012/0007511 A1 | 1/2012 | Choong et al. |
| 2012/0091896 A1 | 4/2012 | Schenk et al. |
| 2012/0153838 A1 | 6/2012 | Schenk et al. |
| 2012/0200226 A1 | 8/2012 | Knibbe et al. |
| 2012/0217882 A1 | 8/2012 | Wong et al. |
| 2012/0281879 A1 | 11/2012 | Vlutters et al. |
| 2013/0069540 A1 | 3/2013 | Schenk et al. |
| 2013/0140995 A1 | 6/2013 | Jones |
| 2013/0334971 A1 | 12/2013 | Jones |

OTHER PUBLICATIONS

U.S. Appl. No. 13/310,911, Dec. 17, 2013, Final OA.

U.S. Appl. No. 13/970,424, Dec. 13, 2013, Non-Final OA.

Notice of Allowance from U.S. Appl. No. 13/310,911, issued Mar. 10, 2014, 14 pgs.

Notice of Allowance from U.S. Appl. No. 13/970,424, issued Mar. 17, 2014, 13 pgs.

MULTIPLE LIGHT SENSOR MULTIPLE LIGHT FIXTURE CONTROL

CROSS-REFERENCES TO RELATED APPLICATIONS

This application claims the benefit of U.S. Prov. Pat. App. No. 61/656,905 filed Jun. 7, 2012, and titled "Light Fixture Optical Burst Demodulation and Control Techniques," which is entirely incorporated herein by reference for all purposes.

BACKGROUND

Light level adjustment can be an effective energy saving technique. Auto commissioning, personal control and/or daylighting techniques can be used to easily install and operate systems that adjust light within an architectural space. Daylighting is the practice of placing a window or other openings and/or reflective surfaces in an architectural space so that during the day natural light provides effective internal lighting. Particular attention is given to daylighting while designing a building when the aim is to maximize visual comfort or to reduce energy use. Auto commissioning and personal control can also affect energy consumption in a lighting system and/or used to easily install and operate systems that adjust light within an architectural space.

SUMMARY

Embodiments of the invention are directed toward systems and methods for controlling one or more light sources from one or more light sensors. One embodiment comprises a system that includes one or more light fixtures and one or more sensors.

In some embodiments, each light fixture can include a light source; a power supply adapter coupled with the light source; a receiver; and a fixture controller in electrical communication with the receiver and either or both the light source and the power supply, wherein the fixture controller is configured to control the light output of a light sources coupled with the light source. The fixture controller can receive the sensor data from each of the plurality of sensors via the respective receiver; and adjust the light output of a light source coupled with the respective light source based on the sensor data.

Each of the sensors include a light detector configured to detect light values; a transmitter configured to be in communication with the receiver at each of the plurality of light fixtures; and a sensor controller in electrical communication with the light detector and the transmitter. The sensor controller is configured to receive light values from the respective light detector; determine a light contribution value for each of the plurality of light fixtures based on the light values, wherein the light contribution represents the light contribution of each of the plurality of light fixtures to a total light level detected at the respective light detector; and communicate sensor data to each of the plurality of light fixtures via the respective transmitter, wherein the sensor data comprises the light contribution for each of the plurality of light fixtures.

In some embodiments, the sensor data comprises a light adjustment value that includes a difference between a desired light level, the desired light level, and/or the total light level detected at the light detector. In some embodiments the fixture controller at each of the plurality light fixtures is configured to adjust the light output of a light source coupled with the respective light source based on a function of the desired light level at each of the plurality of sensors and the respective light contribution of the fixture at each of the plurality of sensors.

The fixture controller at each of the plurality of light fixtures adjusts the light output of a respective light source coupled with the respective light source based on the sensor data and the light output setting of the respective light source. In some embodiments the sensor controller is further configured to determine a delivery effectiveness value for each of the plurality of light fixtures based on the light contribution and the light output setting of each of the light fixtures; and the sensor data further comprises the delivery effectiveness value for each of the plurality of light fixtures. In some embodiments the fixture controller at each of the plurality of light fixtures is configured to communicate a light fixture identification code. The sensor controller at each of the plurality of sensors is configured to receive the light fixture identification code and associate the light fixture identification code with the light value of the respective light fixture within the sensor data.

Some embodiments of the invention include a method for adjusting the light output of a fixture disposed in an architectural space. The method includes receiving a first light adjustment value for a first portion of the architectural space; receiving a second light adjustment value for a second portion of the architectural space; determining a first value representing a geometric relationship between the fixture and the first portion of the architectural space; determining a second value representing a geometric relationship between the fixture and the second portion of the architectural space; and controlling an output of the fixture based on a function of the first value and the second value.

In some embodiments, the method also includes receiving a second light contribution of the fixture within the second portion of the architectural space, and wherein the second value is a function of the second light contribution. In some embodiments, the output of the fixture is based on a function of the first value, the second value, the first light adjustment value, and the second light adjustment value.

Some embodiments of the invention include a method for adjusting the light output of a fixture having a light source. The method includes receiving a first light contribution value from a first light sensor, wherein the first light contribution value represents the light contribution of the fixture relative to a total light level detected at the first light sensor; receiving a first light adjustment value from the first light sensor; receiving a second light contribution value from a second light sensor, wherein the second light contribution value represents the light contribution of the fixture to a total light level detected at the second light sensor; receiving a second light adjustment value from the second light sensor; determining an adjustment value based on the first light adjustment value weighted by a function of the first light contribution value and the second light adjustment value weighted by a function of the second light contribution value; and adjusting a light output of the fixture based on the weighted adjustment value.

In some embodiments, the function of the first light contribution value comprises a ratio of the first light contribution value and a light output setting of the fixture, and wherein the function of the second light contribution value comprises a ratio of the second light contribution value and the light output setting of the fixture. In some embodiments, the first light contribution value and the first light adjustment value are received as a first data packet; and the second light contribution value and the second light adjustment value are received as a second data packet. In some embodiments, the first data packet includes a first light delivery effectiveness value comprising a ratio of the first light contribution value and a light output setting of the fixture, and wherein the second data packet includes a second light delivery effectiveness value comprising a ratio of the second light contribution value and the light output setting of the fixture. In some embodiments, the method further includes modulating the light output of the fixture with a light fixture identification code and/or modulating the light output of the fixture with a light output setting. In some embodiments, the modulating occurs in response to a request from a light sensor.

Some embodiments of the invention include a method for monitoring the light level in an architectural space at a light sensor. The method can include determining a total light value corresponding to a detected total light level in the architectural space; receiving a first light output value from a first light source; receiving a second light output value from a second light source; determining a light contribution of the first light source; determining a light contribution of the second light source; determining a first light delivery effectiveness value from the first light output value and the light contribution of the first light source; determining a second light delivery effectiveness value from the second light output value and the light contribution of the second light source; communicating the first light delivery effectiveness value and a total light adjustment value to at least the first light fixture; and communicating the second light delivery effectiveness value and the total light adjustment value to at least the second light fixture.

In some embodiments, the first light delivery effectiveness value is determined from the first light output value, the light contribution of the first light source, and the light contribution of the second light source, and wherein the second light delivery effectiveness value is determined from the second light output value, the light contribution of the first light source. In some embodiments, determining a light contribution of the first light source further comprises: detecting a modulated light signal; determining a first light source identifier corresponding to the first light source from the modulated change in the light level; determining the contribution of the first light source to the light value from the range of the light level during modulation.

Some embodiments of the invention include a method for adjusting the light output at a light fixture, the method comprising: directing a light source to illuminate an architectural space with a light output value; determining a value representing a geometric relationship of the fixture relative to a light sensor; and adjusting the light output value based on a function comprising the value representing the geometric relationship; and directing a light source to illuminate an architectural space with the adjusted light output value.

Some embodiments of the invention the method can further comprise receiving an indication of a utility demand response prior to determining a value representing a geometric relationship of the fixture relative to a light sensor. The method can also include adjusting the light output value based on a function comprises a function of the geometric relationship and the second geometric relationship. In some embodiments, the value representing the geometric relationship of the fixture relative to the light sensor comprises a function of the light contribution measured at the sensor and the output setting of the light fixture.

In some embodiments, the method can further comprise receiving data indicating a first effectiveness value and a second effectiveness value, wherein the first effectiveness value comprises a ratio of the light contribution measured at the sensor and a light output setting of the light fixture, and wherein the second effectiveness value comprises a ratio of the light contribution measured at a second sensor and the light output setting of the light fixture. The method can also include determining a first normalized effectiveness value and a second normalized effectiveness value, wherein the first normalized effectiveness value comprises a function of a ratio of the first effectiveness value and the sum of the first effectiveness value and the second effectiveness value, and wherein the second normalized effectiveness value comprises a function of a ratio of the second effectiveness value and the sum of the first effectiveness value and the second effectiveness value. In some embodiments, the light output value is a function the first normalized effectiveness value and the second normalized effectiveness value.

In some embodiments, the method can include comprising modifying the first normalized effectiveness value in the event that the first normalized effectiveness value is greater than a first predetermined threshold value.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are disclosed to control light output one or more light fixtures based on input from one or more light detectors. Some embodiments of the invention can be used to ensure that light output at the light fixtures provides a combined uniform photometric distribution within an architectural space. Moreover, embodiments of the invention can respond to changes to ambient light, which illuminates the architectural space without a light fixture (e.g., a window, door, or television, etc.), in a smooth and non-oscillating way. Moreover, embodiments of the invention can provide a continuous photometric distribution between one or more sensor. Embodiments of the invention may also be used for auto commissioning, personal control and/or day lighting.

Embodiments of the invention can be implemented in lighting systems employing multiple light fixtures having one or more light source and one or more light detectors (or sensors). These light fixtures can comprise luminaires or any other type of light fixture known in the art in any configuration. These light fixtures can include direct and/or indirect light fixtures.

Figure 1:
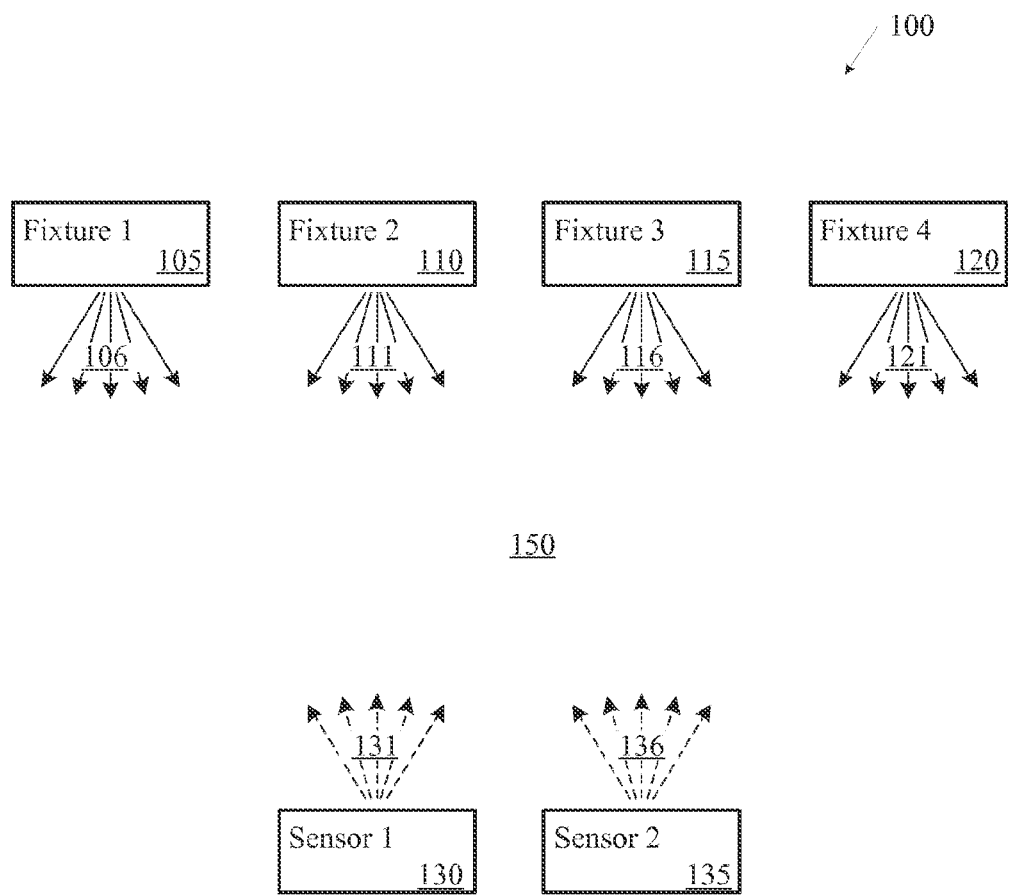
FIG. 1 is a block diagram of an illumination system according to some embodiments of the invention.

FIG. 1 is a block diagram of illumination system 100 according to some embodiments of the invention. Illumination system includes four light fixtures 105, 110, 115, and 120; and two sensors 130 and 135. Light fixtures 105, 110, 115, and 120 illuminate architectural space 150. For instance, light fixture 105 illuminates architectural space 150 with light 106, light fixture 110 illuminates architectural space 150 with light 111, light fixture 105 illuminates architectural space 150 with light 116, and light fixture 120 illuminates architectural space 150 with light 121. While four light fixtures are shown, any number can be included.

Light fixtures 105, 110, 115, and/or 120 can include a number of characteristics. Light fixtures 105, 110, 115, and/or 120 may be secured to, recessed within, or hung from a wall or ceiling. Light fixtures 105, 110, 115, and/or 120 can produce light with different light levels and/or colors. Light fixtures 105, 110, 115, and/or 120 can produce light using one or more incandescent bulbs, LEDs, fluorescent bulbs, etc. Light fixtures 105, 110, 115, and/or 120 can communicate with each other, sensors 130 and 135, and/or any other device by modulating light 106, 111, 116, and/or 121 with various communication protocols. While four light fixtures are shown, any number can be used.

Sensors 130 and 135 include light detection sensors. Sensors 130 and 135 may also include an RF transmitter (or transceiver) that can be used to communicate with light fixtures 105, 110, 115, and/or 120 and/or another device using RF channels 131 and/or 136 (dotted lines). While only two sensors are shown, any number can be used.

Sensors 130 and 135 can detect the total light within architectural space 150. The total light consists of the light from each light fixture 105, 110, 115 and 120 that are in communication with sensors 130 and 135 and the ambient light in the space. The ambient light can include light from any source that is not communicating with sensor 130 or 135. The ambient light, for example, can come from windows, doors, other architectural spaces, lamps, electronics (e.g., computers, displays, televisions, etc.), light fixtures that are not in communication with either or both sensor 130 and 135, etc.

Architectural space 150 can include any room, structure or enclosure where lights are used for illumination. Architectural space 150 can include one or more windows, doors, and/or digital display that illuminate the architectural space with ambient light.

Light fixtures 105, 110, 115, and/or 120 can communicate with sensors 130 and 135 using modulated light channels such as with light 106, 111, 116, and 121. Data can be communicated in any number of protocols or communication schemes. For example, data can be communicated over light bursts using data packets with binary data encoded thereon. The modulated frequency of the data can be greater than about 60 Hz in order for the signals to be imperceptible to a human observer. The modulated signal(s) can include binary bursts of coded light. In some embodiments, a communication pulse can be less than 80 microseconds in length. In some embodiments, the communication protocol can decrease the amount of time the light is turned off (e.g., a 0 bit) when communicating light bursts. For example, communication protocol can ensure that the light source is off for less than 500, 250, 150, 100, 50, 1 or less microseconds.

As another example, data can be communicated using pulse position modulation techniques. For instance, two bursts are transmitted. The first burst can be considered the synchronization burst and the timing of the second burst relative to the first can represent the value of the data. One value can be represented by the second burst being in a first location. A second value can be represented by the second burst being in a second location.

As described in more detail below, light fixture 105 can communicate a unique light fixture identifier and/or a light output value that indicates light output or the luminance of a light source or light sources in the fixture. The light output value can be indicated as a measure of the power provided of a light source in light fixture 105. In some embodiments, light fixture 105 can communicate the light output value of the light source by indicating the maximum light output of the light source and the percentage of the maximum light output of the light source. The maximum light output of the light source and/or the percentage of the maximum light output of the light source can be estimates.

Various other data can be communicated from the light fixture to the sensor.

Figure 2:
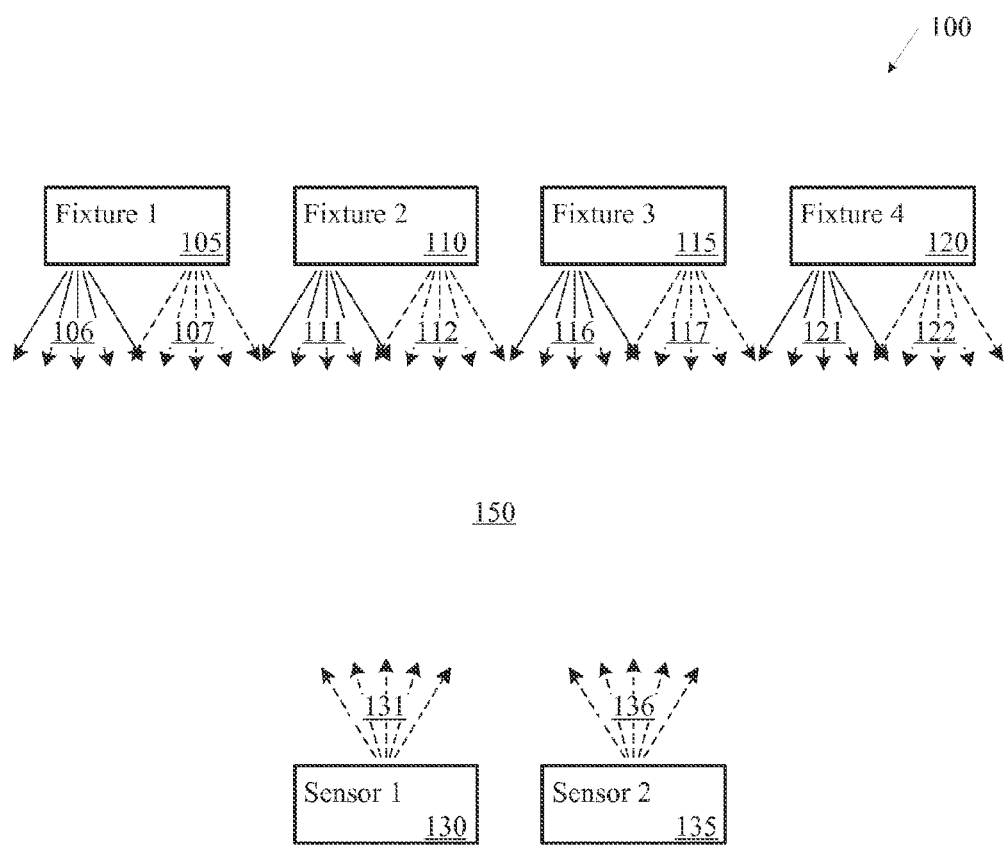
FIG. 2 is another block diagram of an illumination system according to some embodiments of the invention.

FIG. 2 is a block diagram of illumination system 100 with light fixtures 105, 110, 115, and/or 120 that include a radio frequency (RF) transmitter (or transceiver) that can be used to communicate with sensors 130 and 135 and/or another device using RF channels 107, 112, 117, and 122 (dotted lines). Moreover, light fixtures 105, 110, 115, and/or 120 and/or sensors 130 and 135 may include a transmitter for communicating among other communication channels such as an infrared (IR) communication channel, a light channel, a powerline channel, a wired channel, etc. Light fixture 105 can, for example, communicate data such as a light fixture identifier and/or fixture luminance using any type of communication channel. Even though this disclosure may reference light fixture 105 alone, such disclosure may also apply to light fixtures 110, 115 and 120 or any other light fixture.

Figure 3:
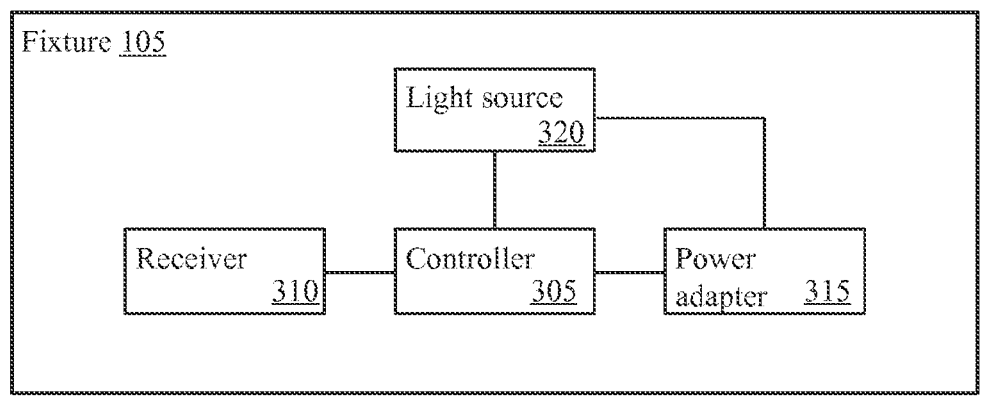
FIG. 3 is a block diagram of a fixture according to some embodiments of the invention.

FIG. 3 is a block diagram of light fixture 105 according to some embodiments of the invention. Light fixture 105 includes light source 320, which can, for example, include a socket configured to receive a light bulb, LED, or any other light source. Light source 320 can include any type of light source 320 such as a light bulb or LED. Light source 320 can be coupled with power adapter 315 and/or controller 305. Light fixture 105 can also include receiver 310.

Receiver 310 can include any type of RF receiver or transceiver that can receive communication from sensors 130 and 135. Receiver 310 can be any type of receiver whether wired or wireless. Receiver 310 can communicate using any type of communication protocol such as, for example, Zigbee, 6LOWPAN, 802.15.4, WiFi, etc. Data received from receiver 310 can be used by controller 305 to control operation of light fixture 105.

Power adapter 315 can couple light fixture 105 to an AC or DC power supply. Power adapter 315 can include any type or number of AC to DC converters op amps, resistors, capacitors, inductors, filters, etc. Power adapter 315 can be coupled with either controller 305 and/or light source 320.

Controller 305 can include any type of general purpose or specialty processor. Controller 305, for example, can include all or any of the components of computational system 1200 shown in FIG. 12. Controller 305 may also be any type of integrated circuit such as an field programmable gate array (FPGA), application-specific instruction-set processor (ASIP), application-specific integrated circuit (ASIC), complex programmable logic device (CPLD), programmable array logic (PAL), very high speed integrated circuit (VHDL or VHSIC), etc. Controller 305 can be programmed to execute program code that executes any process, method, or flow chart described herein or elsewhere.

Controller 305 can control the operation of light fixture 105 using, for example, data received from sensors 130 and 135 through receiver 310. Controller 305 can control operation of a light source coupled with light source 320 in accordance with processes 800 and 900. Controller 305 can control power delivered from power adapter 315 to light source 320 and or the modulation of a light source coupled with light source 320 as discussed in more detail below.

Figure 4:
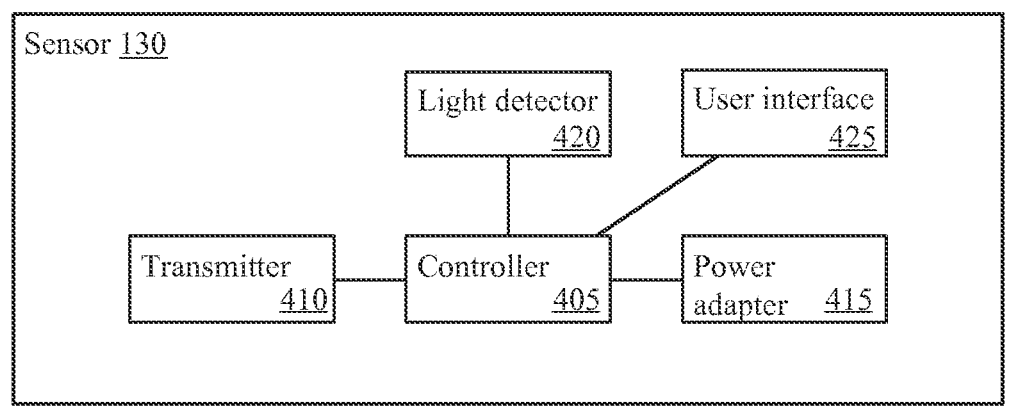
FIG. 4 is a block diagram of a sensor according to some embodiments of the invention.

FIG. 4 is a block diagram of sensor 130 according to some embodiments of the invention. Even though this disclosure may reference sensor 130 alone, such disclosure may also apply to sensor 135 or any other light fixture. Sensor 130 includes light detector 420, controller 405, power adapter 415, user interface 425, and/or transmitter 410.

Controller 405 can include any type of general purpose or specialty processor. Controller 405, for example, can include all or any of the components of computational system 1200 shown in FIG. 12. Controller 405 may also be any type of integrated circuit such as field programmable gate array (FPGA), application-specific instruction-set processor (ASIP), application-specific integrated circuit (ASIC), complex programmable logic device (CPLD), programmable array logic (PAL), very high speed integrated circuit (VHDL or VHSIC), etc. Controller 405 can be programmed to execute program code that executes any process, method, or flow chart described herein or elsewhere.

Light detector 420 can include one or more photodiodes of any type, for example, active pixel sensors, charged-coupled devices (CCD), reverse biases LEDs, photoresistors, photovoltaic cells, photodiodes, photomultiplier, phototubes, phototransistor, etc. Light detector can be coupled with controller 405 and can detect the light incident at light detector 420. In some embodiments, an amplifier and/or analog to digital converter can also be positioned between light detector 420 and controller 405.

Power adapter 415 can couple controller 405 to an AC or DC power supply, for example, a battery. Power adapter 415 can include any type or number of AC to DC converters op amps, resistors, capacitors, inductors, filters, etc.

User interface 425 can be used to receive input from a user to receive an indication from a user setting the amount of light output from light fixtures 105, 110, 115 and 120 or the amount of light received at sensor 130. The user input can include a number of buttons or dials in any form.

Embodiments of the invention can be used to control the light levels of light fixtures 105, 110, 115 and 120 using data from sensors 130 and 135. In particular the individual light output from each light fixture can be adjusted based on data from sensors 130 and 135.

Figure 5A:
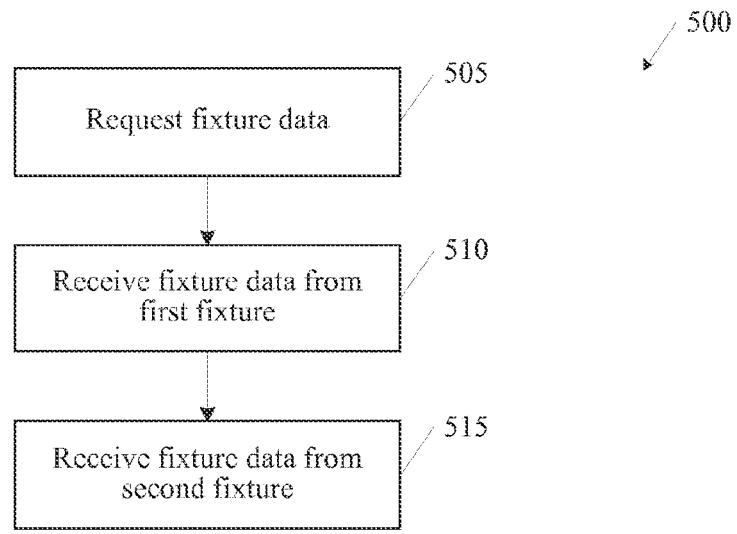
FIG. 5A is a flowchart of a process 500 for discovering available light fixtures according to some embodiments of the invention.
Figure 5B:
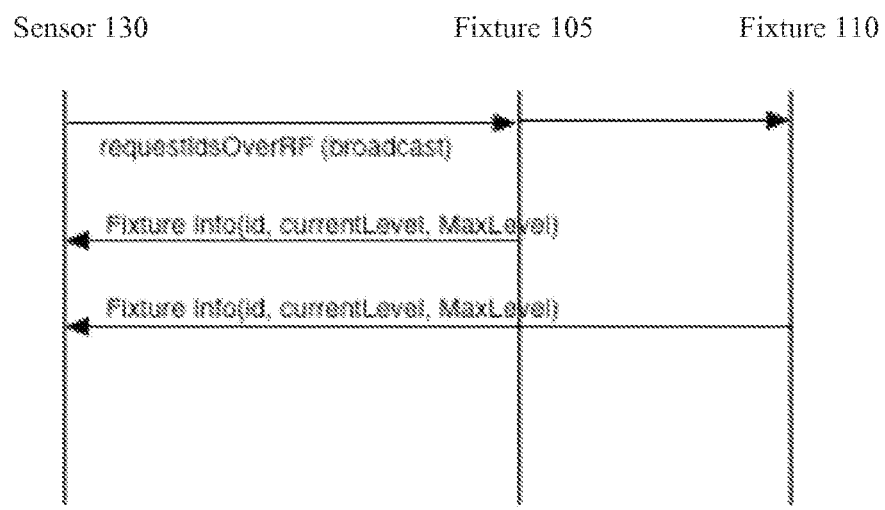
FIG. 5B is a diagram showing communication between a sensor and a first fixture and a second fixture according to some embodiments of the invention.

FIG. 5A is a flowchart of process 500 for discovering available light fixtures according to some embodiments of the invention. And FIG. 5B is a diagram showing communication between sensor 130 and first light fixture 105 and second light fixture 110 as shown in process 500. Process 500 can be used to ensure available sensors know which light fixtures are available. Process 500 begins with block 505 when sensor 130 broadcasts a request to all available light fixtures (e.g., light fixtures 105, 110, 115, and 120) requesting information from each fixture. While process 500 describes communication with two light fixtures, any number of light fixtures can be used. Sensor 130 can broadcast this request using transmitter 410.

Each light fixture can receive the broadcast request through receiver 310. In response, at block 510 a first fixture can communicate a fixture information message. The fixture information message can be sent by modulating a light source coupled with light fixture and can include a unique fixture identifier, the fixture maximum light level available at the fixture, and the current light level of the fixture. Various other data can be communicated within fixture information message. At block 520 a second fixture can communicate the same information pertinent to the second fixture. This information can be received from the first light fixture and the second light fixture through light detector 420.

Figure 6:
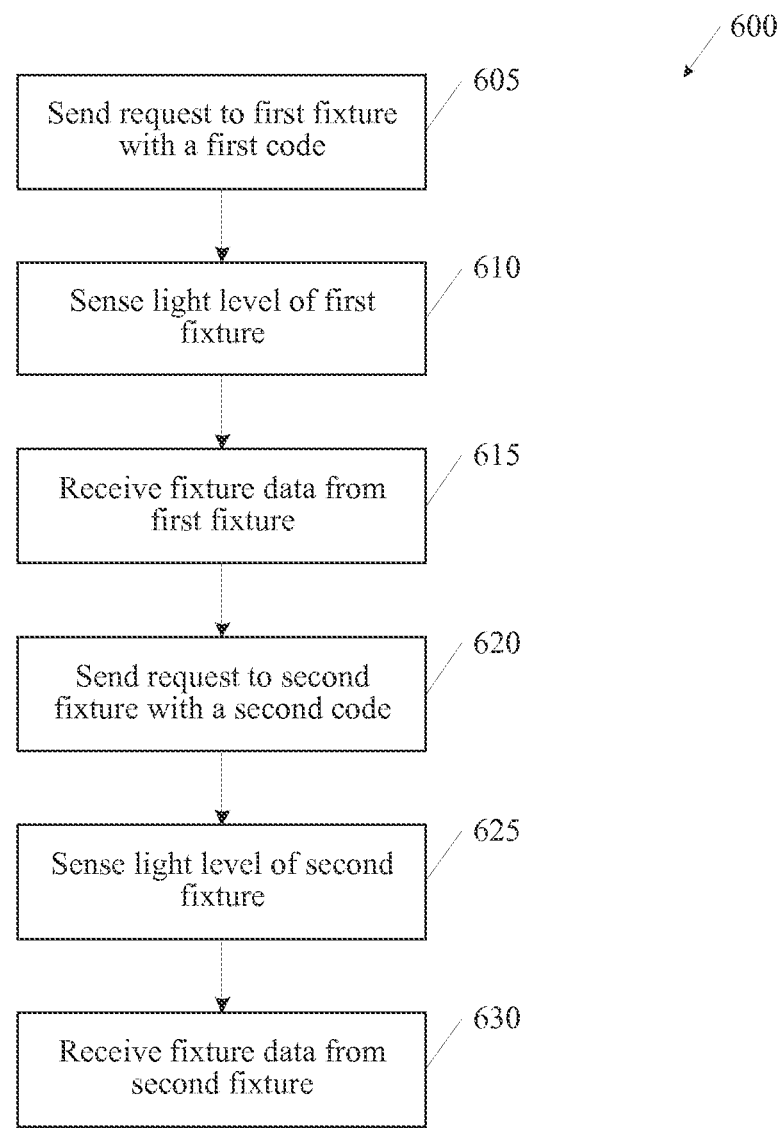
FIG. 6 is a flowchart of a process for determining fixture contributions according to some embodiments of the invention.
Figure 7:
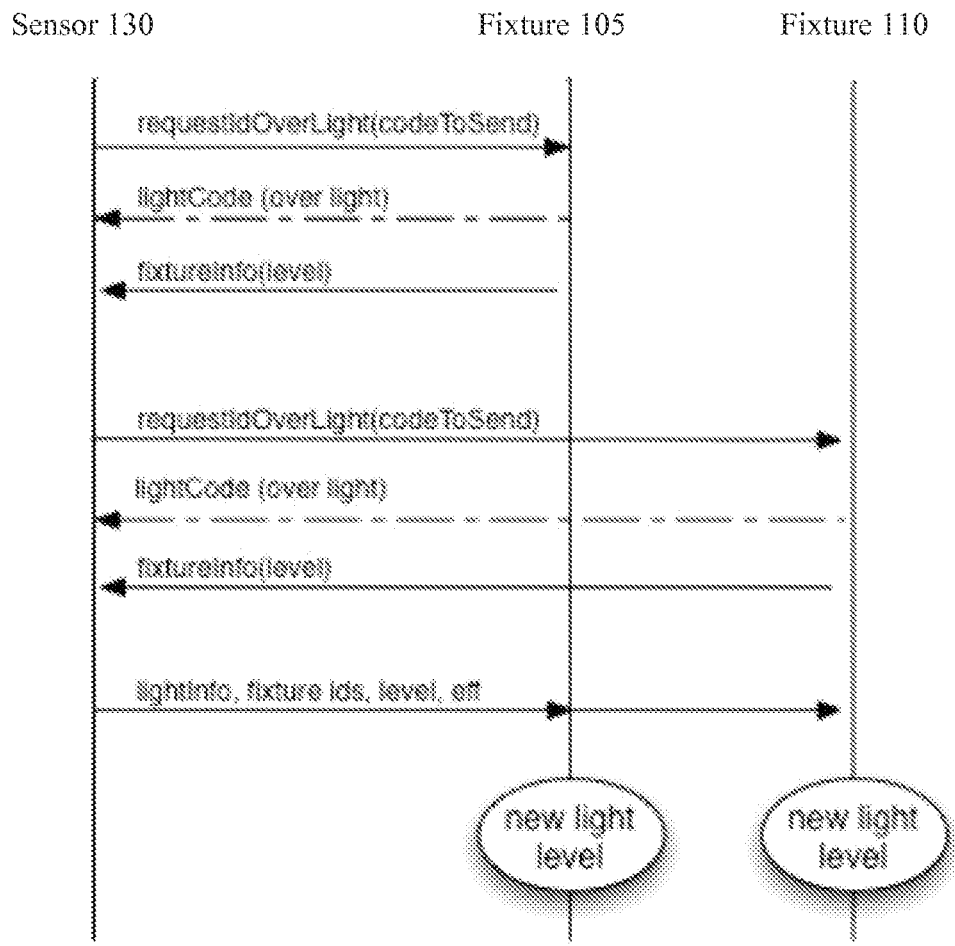
FIG. 7 is a diagram showing communication between a sensor and both a first fixture and a second fixture as shown in FIG. 6.

FIG. 6 is a flowchart of process 600 for determining a fixture contribution according to some embodiments of the invention. And FIG. 7 is a diagram showing communication between sensor 130 and both first light fixture 105 and second light fixture 110 as shown in process 600. Process 600 starts at block 605; sensor 130 sends a request to a first fixture via transmitter 410. The request can identify the first fixture with the fixture identifier received in response to the broadcast message as described above in conjunction with process 500. The request can also specify a specific code for the first fixture to modulate the light in response to receiving the request. In response, the first fixture can communicate the first code by modulating the light source in accordance with the first code.

A block 610, sensor 130 can sense reception of the first code using light detector 420. Sensor 130 can measure the difference in light levels between modulated signals from the first fixture. Because other fixtures and ambient light may be detected, the first light contribution value of the first light fixture can be determined from the difference between the high and low of the received modulated signal. At block 615, the first fixture may resend the fixture information message.

At block 620, sensor 130 sends a request to a second fixture via transmitter 410. The request can identify the second fixture with the fixture id received in response to the broadcast message as describe above in conjunction with process 500. The request can also specify a specific code for the second fixture to modulate the light in response to receiving the request. In response, the second fixture can communicate the second code by modulating the light source in accordance with the second code.

A block 625 sensor 130 can sense reception of the second code using light detector 420. Sensor 130 can measure the difference in light levels between modulated signals from the second fixture. Because other fixtures and ambient light may be detected, the second light contribution value of the second light fixture can be determined from the difference between the high and low of the received modulated signal. At block 630, the second fixture may resend the fixture information message.

Figure 8:
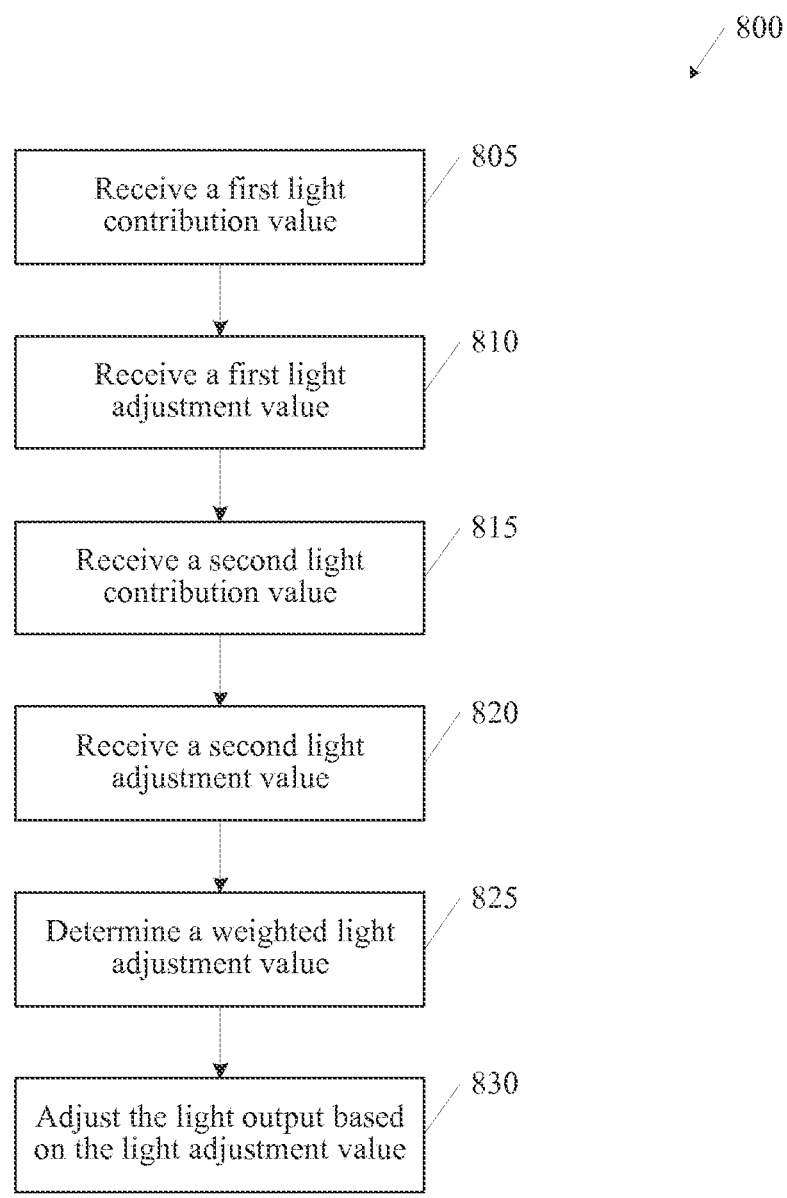
FIG. 8 is a flowchart of a process for adjusting the light output of a fixture according to some embodiments of the invention.

FIG. 8 is a flowchart of process 800 for adjusting the light output of first light fixture 105 when the architectural space is being illuminated with first light fixture 105 and second light fixture 110 according to some embodiments of the invention. Process 800 starts at block 805 where a first light contribution value is received from first sensor 130. The first light contribution value can be determined at first sensor 130 as described above in conjunction with block 610. The first light contribution value can represent the contribution of first light fixture 105 to the total light received at first sensor 130, where the total light received at the fixture includes light from all fixtures (e.g., first fixture 105 and second light fixture 110) and any ambient light (e.g., from a window or television, etc.). In some embodiments, the first light contribution value can be expressed as a function of the ratio (or effectiveness) of the first light contribution divided by the light output of the fixture. For example, the light contribution can be a function of the ratio of the light contribution of light fixture 105 at sensor 130 divided by the light output setting at fixture 105.

At block 810 a first light adjustment value can be received from first sensor 130. The first light adjustment value may be an adjustment value from the current value to the desired value at the first light sensor or the first light adjustment value may be the desired light value at first sensor 130. The first light adjustment value and the first light contribution value, among others, may be received at first fixture 105 in conjunction with a single communication from first sensor 130 to the light fixture.

At block 815 a second light contribution value is received from second sensor 135. The second light contribution value can be determined at second sensor 135 as described above in conjunction with block 625. The second light contribution value can represent the contribution of first light fixture 105 to the total light received at second sensor 135, where the total light received at second sensor 135 includes light from all fixtures (e.g., first fixture 105 and second fixture 110) and any ambient light (e.g., from a window or television, etc.). In some embodiments, the second light contribution value can be expressed as a function of the ratio (or effectiveness) of the second light contribution divided by the total light received at second sensor 135 from all fixtures in communication with second sensor 135. For example, the second light contribution can be a function of the ratio of the light contribution of light fixture 105 at sensor 135 divided by the sum of light contributions from light fixtures 105, 110, 115 and 120.

At block 820 a second light adjustment value can be received from second sensor 135. The second light adjustment value may be an adjustment value from the current value to the desired value at the second light sensor or the first light adjustment value may be the desired light value at second sensor 135. The second light adjustment value and the second light contribution value, among others, may be received at first fixture 105 in conjunction with a single communication from the second sensor 135 to the light fixture.

At block 825, a new light adjustment value can be determined based on a function of the first light contribution value, the second light contribution value, the first light adjustment value, and the second light adjustment value. And at block 830, the light output at first fixture 105 can be changed.

While process 800 describes receiving a first and second light adjustment values and receiving first and second light contribution values any number of light adjustment values and light contribution values can be received depending on the number of sensors in use.

For example, the new light adjustment value can be determined as follows: A first effectiveness value of first light fixture 105 at first sensor 130 can be determined from the first light contribution value. If the first light contribution value is expressed as a ratio, then the first effectiveness value is equal to the first contribution value. If not, then first effectiveness value is set to the ratio of the first light contribution divided by the fixture output setting. The second effectiveness value of the first light fixture at second sensor 135 can be determined in a similar fashion. The total effectiveness can be calculated as the sum of the first light effectiveness value and the second light effectiveness value. In embodiments with more light fixtures, all light efficiencies shall be summed. In some embodiments, the efficiencies can be calculated at the fixture or the sensor.

The adjustment value for first fixture 105 can be set as the first adjusted light value times the first effectiveness value plus the second adjusted light value times the second effectiveness value. Mathematically speaking, the adjustment at the first fixture can be expressed as:

$$A_1 = \sum_{i=1}^{n} E_1^i A^i,$$

where $A_1$ is the light adjustment value at the first fixture, $E_1^i$ is the effectiveness value of the first fixture at the $i^{th}$ sensor and $A^i$ is the light adjustment value at the $i^{th}$ sensor, and n is the number of sensors. And the effectiveness value, $E_1^i$, can be expresses as a function of the light delivery efficiency at each sensor:

$$E_1^i = \frac{F_1^i}{\sum_{j=1}^{m} F_j^i},$$

where $F_1^i$ is the light fixture efficiency of the first fixture at the $i^{th}$ sensor and m is the total number of fixtures. Thus, the light effectiveness value $E_1^i$ is a normalized value that is a function of the light produced from all the fixtures in communication with the sensor, but not ambient light from other light sources.

In some embodiments, process 800 can occur completely at a fixture. In some embodiments, the effectiveness value calculations can be made at either a sensor or a fixture. Moreover, in some embodiments, process 800 can occur at a fixture in response to a command to adjust the light that has been received from one or more sensors.

Figure 9:
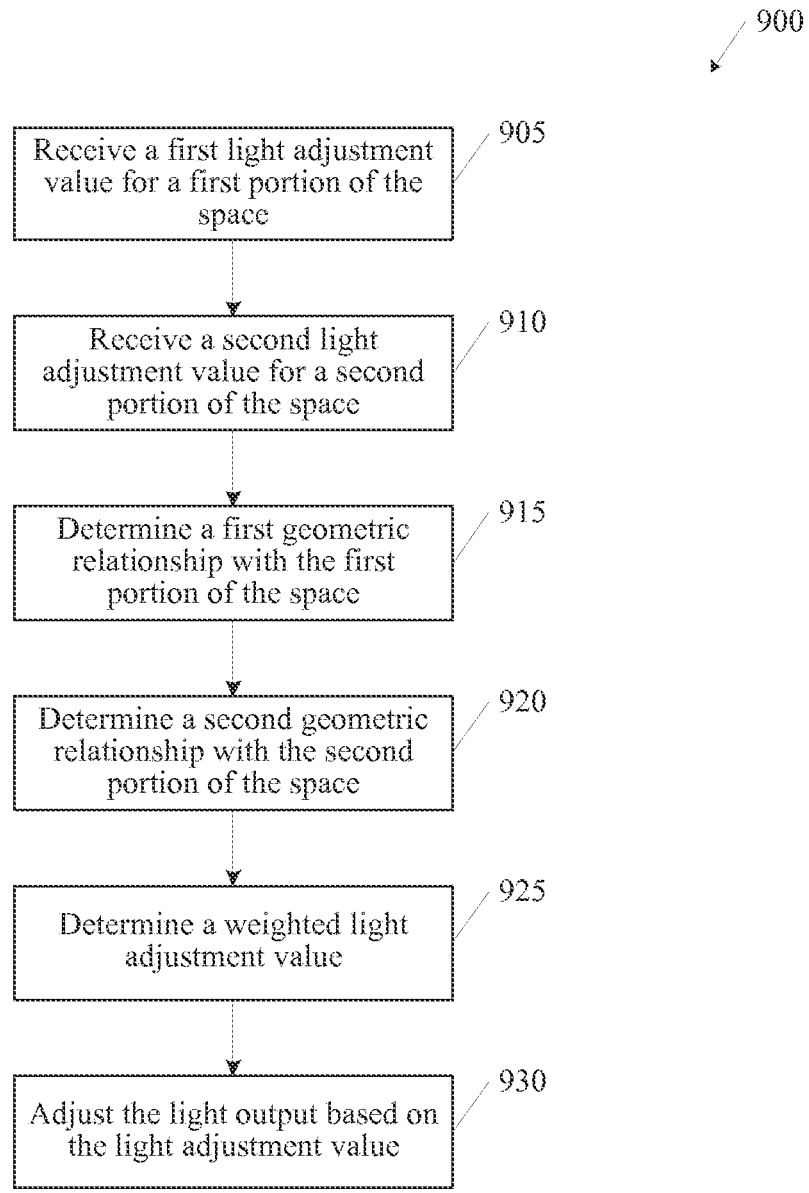
FIG. 9 is a flowchart of a process for adjusting the light output of a fixture according to some embodiments of the invention.

FIG. 9 is a flowchart of process 900 for adjusting the light output of first fixture 105 according to some embodiments of the invention. Process 900 starts at block 905. A first light adjustment value for a first portion of the architectural space can be received at first light fixture 105. At block 910 a second light adjustment value for a second portion of the architectural space can be received at first light fixture 105. The first light adjustment value and/or the second light adjustment value can be sent from first sensor 130 and second sensor 135 respectively, from a central controller, a mobile phone, a tablet, a wearable electronic device, a watch, Google glasses, a computer system, etc.

At block 915, a first value representing a geometric relationship between first fixture 105 and the first portion of the architectural space can be determined. At block 920 second value representing a geometric relationship between first fixture 105 and the second portion of the architectural space can be determined. Either or both of these geometric relationships can be determined based on measured values such as the amount of light produced at first fixture and the amount of light detected in either the first portion of the architectural space or the second portion of the architectural space (e.g., the effectiveness value of the fixture in the architectural space). Either or both of these geometric relationships can be determined based on light contribution from the first fixture in either architectural space. Moreover, either or both of these geometric relationships can be determined from recorded and/or measured distances between the first fixture and the architectural spaces.

At block 925, a weighted light adjustment value can be determined based on the first light adjustment value weighted by the geometric relationship between first fixture 105 and the first portion of the architectural space, and the second light adjustment value and the geometric relationship between first fixture 105 and the second portion of the architectural space. At block 930, the light fixture can adjust the light output based on the weighted light adjustment value.

Figure 10:
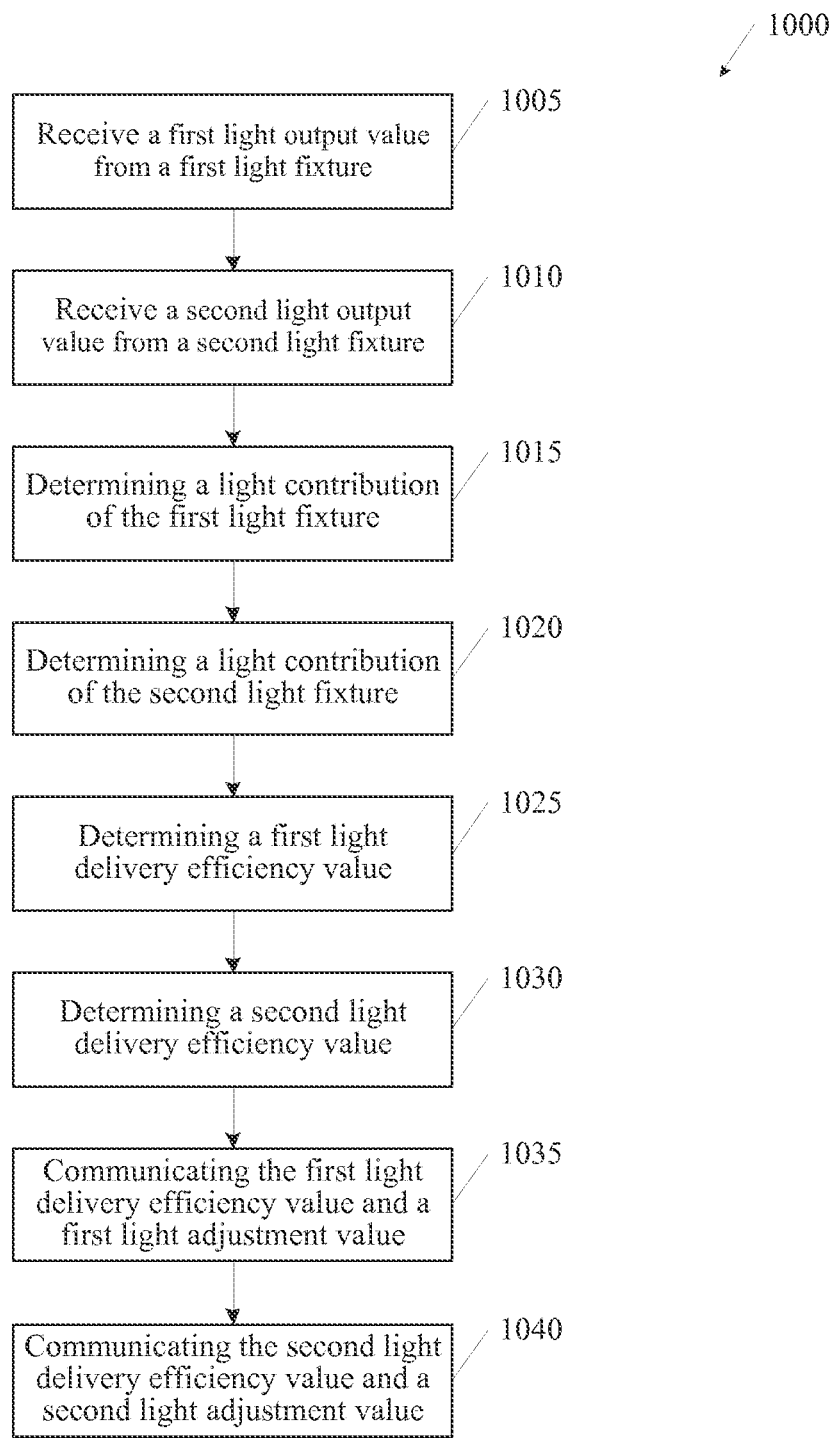
FIG. 10 is a flowchart of a process for detecting the light contribution of one or more fixtures at a sensor according to some embodiments of the invention.

FIG. 10 is a flowchart of process 1000 for detecting the light contribution of two light fixtures at first sensor 130 according to some embodiments of the invention. While two light fixtures are described any number of light fixtures can be used. Process 1000 starts at block 1005 where a first light output value from first fixture 105 can be received. At block 1010 a second light output value from second fixture 110 can be received. The first light output value and the second light output value can represent the current light output setting at the first and second light fixtures respectively.

At block 1015 a first light contribution of first light fixture 105 at first sensor 130 can be determined. The first light contribution is a measure of how much light fixture 105 contributes to the total light incident at first sensor 130. The first light contribution can be determined based on the difference between the detected light at first sensor 130 when first light fixture 105 is modulating off and on.

At block 1020 a second light contribution of second light fixture 110 at first sensor 130 can be determined. The second light contribution is a measure of how much light second light fixture 110 contributes to the total light incident at first sensor 130. The second light contribution can be determined based on the difference between the detected light at first sensor 130 when second light fixture 110 is modulating off and on.

At block 1025 a first light delivery effectiveness value can be determined. The first light delivery effectiveness value can be determined as the ratio of the first light contribution value received at block 805 and the light output setting of the fixture. At block 1030 a second light delivery effectiveness value can be determined. At block 1030 a second light delivery effectiveness value can be determined. The second light delivery effectiveness value can be determined as the ratio of the second light contribution value received at block 805 and the light output setting of the fixture.

At block 1035 the first light delivery effectiveness value and a first light adjustment value can be communicated to first light fixture 105. At block 1040 the second light delivery effectiveness value and a second light adjustment value can be communicated to second light fixture 110. In some embodiments, the first light delivery effectiveness value, the first light adjustment value, the second light delivery effectiveness value, and the second light adjustment value can be communicated in a broadcast message to all available light fixtures. A first light fixture identifier can be associated with the data communicated to first light fixture 105 and a second light fixture identifier can be associated with the data communicated to second light fixture 110. The first light adjustment value can be the difference between the desired light at the sensor 130 and the actual light incident at sensor 130. The first light adjustment value and/or the second light adjustment value can be input through a user interface of any kind.

Figure 11:
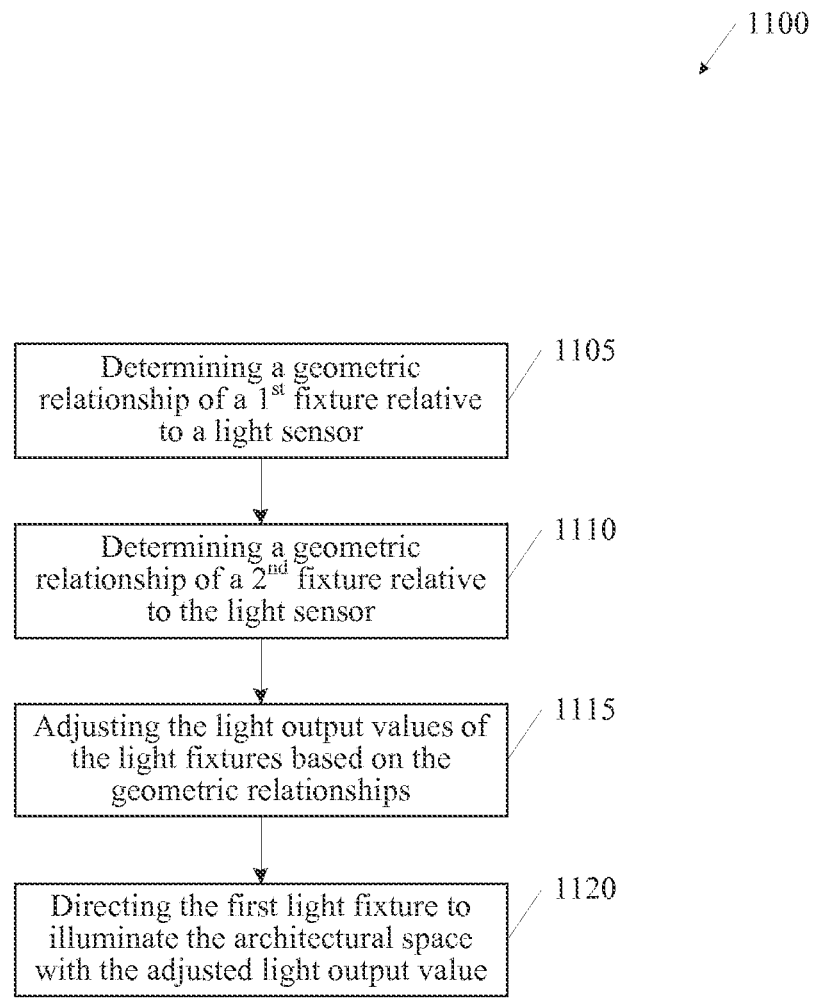
FIG. 11 is a flowchart of a process for sharpening the light output of a fixture in an architectural space according to some embodiments of the invention.

FIG. 11 is a flowchart of process 1100 for sharpening the light output of first light fixture 105 and second light fixture 110 in an architectural space according to some embodiments of the invention. Light sharpening can be used to increase the energy efficiency of illumination system 100 by ensuring that light increases occur from fixtures closest to a sensor. Since light intensity decreases inversely as the square of the distance from the light source, the closest light fixture can have the greatest effect on the sensor.

At block 1105 a geometric relationship between first sensor 130 and first light fixture 105 is determined. At block 1110 a geometric relationship between first sensor 130 and second light fixture 110 is determined. These geometric relationships can be determined as described above. At block 1115 the light output values of first fixture 105 and second fixture 110 can be adjusted based on the geometric relationships. For example, the light output of the light fixture closest to the sensor can be increased and/or the light output of the light fixture furthest to the sensor can be decreased.

In some embodiments, the light adjustment value determined based on data collected at a sensor can be scaled based on any number. For example, the amount the light fixture is adjusted can be adjusted by a factor of 75%, 80%, 85%, 90%, 95%, etc. Moreover, some light fixtures may limit the amount the light fixture can be adjusted at a given time. As such, if the light adjustment value is greater than a light adjustment of ceiling, the light adjustment value can be set to equal either the floor or the ceiling. Moreover, if the light adjustment value results in a light output above a maximum value or below a minimum value then the light adjustment value will be set to adjust the light output to the minimum value or the maximum value.

In some embodiments a normalized effectiveness value can be calculated at each fixture for each sensor. The normalized effectiveness value for a sensor is the effectiveness of the sensor divided by the total effectiveness of the light fixture at all sensors. This normalized effectiveness can be set to fixed values based on the size of the effectiveness value. For example, if the effectiveness of one sensor is greater than 0.8, then the effectiveness is set to 0.8. As another example, if the effectiveness of one sensor is greater than 0.7, then the effectiveness is set to 0.7. As yet another example, if the effectiveness of one sensor is greater than 0.5, then the effectiveness is set to 0.2. And as another example, if the effectiveness of one sensor is less than 0.5, then the effectiveness is set to 0 (zero). Any other values can be used.

Moreover, normalized effectiveness values can be increased or decreased in other ways in order to sharpen the light output of nearby fixtures. For example, the normalized effectiveness value can be multiplied by a constant value if greater than a given value or divided by a constant value if less than a given value. Any mathematical function can be used to increase the effectiveness of one or more fixture over other fixtures. Moreover, in the event that no effectiveness is greater than some value (e.g., 0.7 or 0.8 in the example shown above) then sharpening may not be used.

Embodiments of the invention can be used in response to utility demand response (DR) events. Demand response is a change "in electric usage by end-use customers from their normal consumption patterns in response to changes in the price of electricity over time, or to incentive payments designed to induce lower electricity use at times of high wholesale market prices or when system reliability is jeopardized." In some embodiments, the adjustment values can be lowered, for example, by 15%, 20%, 25%, 30%, 35%, 40%, etc. in response to a demand response event.

In some embodiments, the fixtures closest to the light sensors can have increased light output while fixtures further away can have decreased light output in response to a demand response event as described above in conjunction with FIG. 11.

Figure 12:
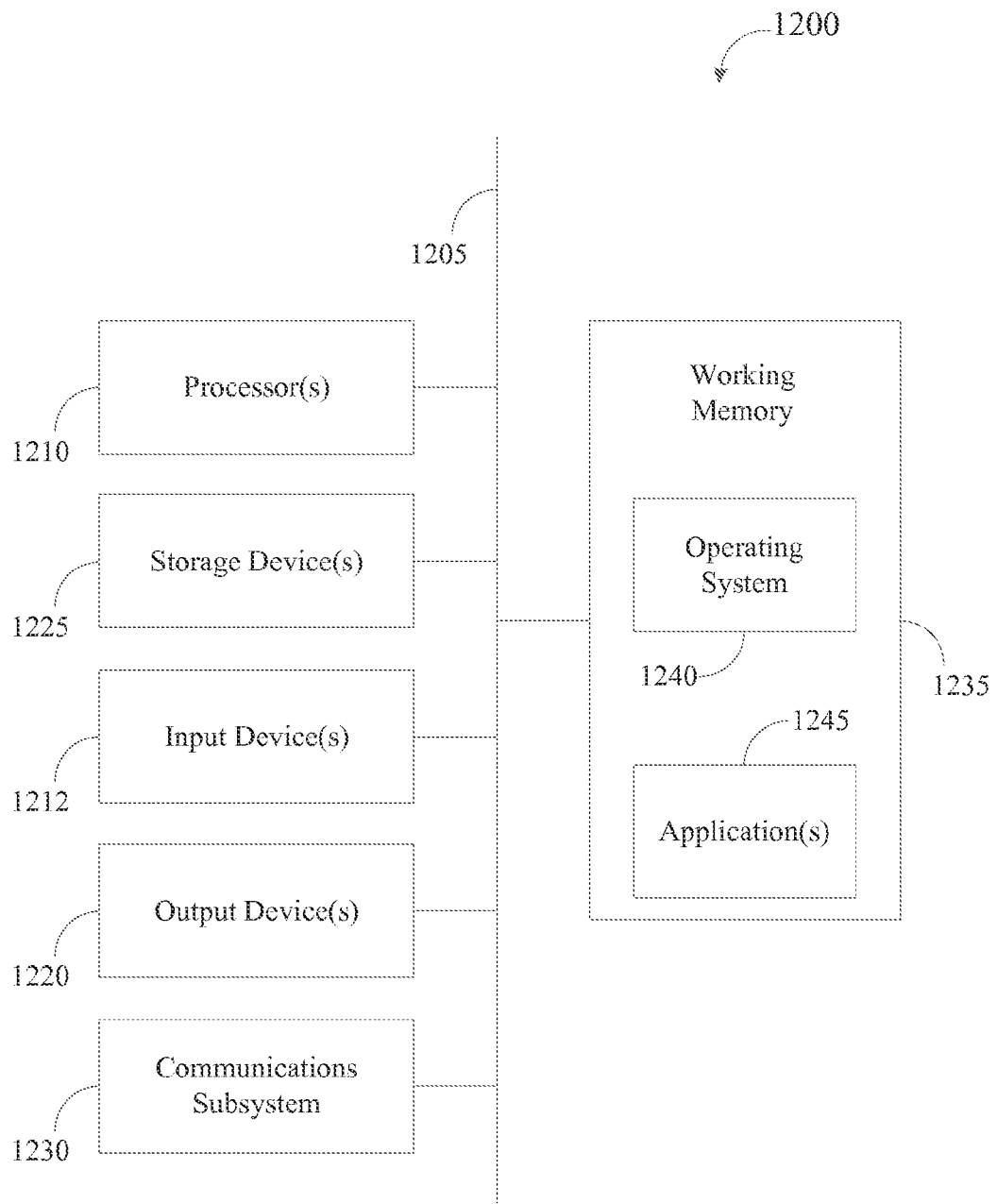
FIG. 12 shows an illustrative computational system for performing functionality to facilitate implementation of embodiments described herein.

The computational system 1200, shown in FIG. 12, can be used to perform control functions described herein. For example, computational system 1200 can be used to perform any program, process, method, or simulation described herein.

Computational system 1200 includes hardware elements that can be electrically coupled via a bus 1205 (or may otherwise be in communication, as appropriate). The hardware elements can include one or more processors 1210, including without limitation one or more general-purpose processors and/or one or more special-purpose processors (such as digital signal processing chips, graphics acceleration chips, and/or the like); one or more input devices 1215, which can include without limitation a mouse, a keyboard and/or the like; and one or more output devices 1220, which can include without limitation a display device, a printer and/or the like.

Computational system 1200 may further include (and/or be in communication with) one or more storage devices 1225, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 1200 might also include a communications subsystem 1230, which can include without limitation a modem, a network card (wireless or wired), an infrared communication device, a wireless communication device and/or chipset (such as a Bluetooth device, an 802.6 device, a WiFi device, a WiMax device, cellular communication facilities, etc.), and/or the like. The communications subsystem 1230 may permit data to be exchanged with a network (such as the network described below, to name one example), and/or any other devices described herein. In many embodiments, the computational system 1200 will further include a working memory 1235, which can include a RAM or ROM device, as described above.

The computational system 1200 also can include software elements, shown as being currently located within the working memory 1235, including an operating system 1240 and/or other code, such as one or more application programs 1245, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 1225 described above.

In some cases, the storage medium might be incorporated within the computational system 1200 or in communication with the computational system 1200. In other embodiments, the storage medium might be separate from a computational system 1200 (e.g., a removable medium, such as a compact disc, etc.), and/or provided in an installation package, such that the storage medium can be used to program a general purpose computer with the instructions/code stored thereon. These instructions might take the form of executable code, which is executable by the computational system 1200 and/or might take the form of source and/or installable code, which, upon compilation and/or installation on the computational system 1200 (e.g., using any of a variety of generally available compilers, installation programs, compression and/or decompression utilities, etc.) then takes the form of executable code.

Embodiments of the invention can provide a number of illumination benefits. First, multiple light fixtures can be controlled from multiple sensor control points without awkward flicker, oscillating, or dimming. Embodiments of the invention can result in energy savings. Embodiments of the invention can also flatten a skewed light profile for better occupant comfort and productivity using two sensors. Embodiments of the invention can adjust light output at light fixtures based on changes to ambient light events from non-fixtures.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method for adjusting the light output at a light fixture, the method comprising:
   directing a light source to illuminate an architectural space with a light output value;
   determining a value representing a geometric relationship of the fixture relative to a light sensor, wherein the value representing the geometric relationship is determined from a function of a light contribution measured at an external sensor;
   adjusting the light output value based on a function comprising the value representing the geometric relationship; and
   directing the light source to illuminate the architectural space with the adjusted light output value.

2. The method according to claim 1, further comprising receiving an indication of a utility demand response prior to determining a value representing a geometric relationship of the fixture relative to a light sensor.

3. The method according to claim 1, further comprising determining a second value representing a geometric relationship of the fixture relative to a second light sensor, and wherein the adjusting the light output value based on a function of the geometric relationship and the second geometric relationship.

4. The method according to claim 1, wherein the value representing the geometric relationship of the fixture relative to the light sensor comprises a function of the light contribution measured at the sensor and the output setting of the light fixture.

5. The method according to claim 1, further comprising
   receiving data indicating a first effectiveness value and a second effectiveness value, wherein the first effectiveness value comprises a ratio of the light contribution measured at the sensor and a light output setting of the light fixture, and wherein the second effectiveness value comprises a ratio of the light contribution measured at a second sensor and the light output setting of the light fixture;
   determining a first normalized effectiveness value and a second normalized effectiveness value, wherein the first normalized effectiveness value comprises a function of a ratio of the first effectiveness value and the sum of the first effectiveness value and the second effectiveness value, and wherein the second normalized effectiveness value comprises a function of a ratio of the second effectiveness value and the sum of the first effectiveness value and the second effectiveness value;
   wherein the light output value is a function the first normalized effectiveness value and the second normalized effectiveness value.

6. The method according to claim 5, further comprising modifying the first normalized effectiveness value in the event that the first normalized effectiveness value is greater than a first predetermined threshold value.

7. A light fixture comprising:
   a light source;
   a controller communicatively coupled with the light source, wherein the control is configured to:
      instruct the light source to illuminate an architectural space with a light output value;
      determine a value representing a geometric relationship of the fixture relative to a light sensor, wherein the value representing the geometric relationship is determined from a function of a light contribution measured at an external sensor;
      adjust the light output value of the light source based on a function comprising the value representing the geometric relationship; and
      instruct the light source to illuminate the architectural space with the adjusted light output value.

8. The light fixture according to claim 7, wherein the controller is further configured to receive an indication of a utility demand response prior to determining a value representing a geometric relationship of the fixture relative to a light sensor.

9. The light fixture according to claim 7, wherein the controller is further configured to determine a second value representing a geometric relationship of the fixture relative to a second light sensor, and adjust the light output value based on a function of the geometric relationship and the second geometric relationship.

10. The light fixture according to claim 7, wherein the value representing the geometric relationship of the fixture relative to the light sensor comprises a function of the light contribution measured at the sensor and the output setting of the light fixture.

11. The light fixture according to claim 7, wherein the controller is further configured to:
    receive data indicating a first effectiveness value and a second effectiveness value, wherein the first effectiveness value comprises a ratio of the light contribution measured at the sensor and a light output setting of the light fixture, and wherein the second effectiveness value comprises a ratio of the light contribution measured at a second sensor and the light output setting of the light fixture;
    determine a first normalized effectiveness value and a second normalized effectiveness value, wherein the first normalized effectiveness value comprises a function of a ratio of the first effectiveness value and the sum of the first effectiveness value and the second effectiveness value, and wherein the second normalized effectiveness value comprises a function of a ratio of the second effectiveness value and the sum of the first effectiveness value and the second effectiveness value;
    wherein the light output value is a function the first normalized effectiveness value and the second normalized effectiveness value.

12. The light fixture according to claim 11, wherein the controller is further configured to modify the first normalized effectiveness value in the event that the first normalized effectiveness value is greater than a first predetermined threshold value.

\* \* \* \* \*